United States Patent
Talley et al.

(10) Patent No.: US 8,498,241 B1
(45) Date of Patent: Jul. 30, 2013

(54) USE OF MACRO-NETWORK CHANNEL-LIST MESSAGES FOR SELECTION OF CARRIERS FOR LOW-COST INTERNET BASE-STATION FREQUENCY-HOPPING PILOT BEACONS

(75) Inventors: Ryan S. Talley, Overland Park, KS (US); Christopher M. Yenney, Ashburn, VA (US); Shilpa Kowdley Srinivas, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 12/400,905

(22) Filed: Mar. 10, 2009

(51) Int. Cl.
  *H04W 4/00* (2009.01)
  *H04W 36/00* (2009.01)
  *H04B 7/216* (2006.01)
  *H04W 84/04* (2009.01)
  *H04B 7/26* (2006.01)
  *H04W 36/16* (2009.01)

(52) U.S. Cl.
  CPC ........... *H04W 84/045* (2013.01); *H04B 7/2628* (2013.01); *H04W 36/16* (2013.01)
  USPC ........... 370/328; 370/335; 370/342; 370/441; 455/436; 455/443

(58) Field of Classification Search
  USPC ................. 370/328, 335, 336, 338, 342, 345, 370/347, 441, 442; 455/432, 436, 443
  See application file for complete search history.

(56) References Cited

U.S. PATENT DOCUMENTS

| | | | |
|---|---|---|---|
| 4,578,815 A | 3/1986 | Persinotti | |
| 5,197,093 A | 3/1993 | Knuth et al. | |
| 5,612,948 A | 3/1997 | Fette et al. | |
| 5,617,059 A | 4/1997 | Eggleston | |
| 5,809,398 A | 9/1998 | Moberg et al. | |
| 5,898,382 A | 4/1999 | Treatch | |
| 5,987,304 A | 11/1999 | Latt | |
| 6,119,005 A | 9/2000 | Smolik | |
| 6,132,306 A | 10/2000 | Trompower | |
| 6,289,724 B1 | 9/2001 | Varma et al. | |
| 6,360,098 B1 | 3/2002 | Ganesh et al. | |
| 6,404,775 B1 | 6/2002 | Leslie et al. | |
| 6,463,298 B1 | 10/2002 | Sorenson et al. | |
| 6,477,354 B1 | 11/2002 | Roberts et al. | |
| 6,487,426 B1 | 11/2002 | Haber | |
| 6,542,741 B2 | 4/2003 | Wallstedt et al. | |

(Continued)

FOREIGN PATENT DOCUMENTS

| WO | WO9853621 | 11/1998 |
|---|---|---|
| WO | WO2005011150 | 2/2005 |

OTHER PUBLICATIONS

Spotwave Wireless, Inc., SpotCell™ 112 (PCS-CDMA), "Product Overview," www.spotwave.com, 2003.

(Continued)

*Primary Examiner* — Paul H Masur

(57) ABSTRACT

Methods and systems are provided for selecting carriers for low-cost Internet base station (LCIB) frequency-hopping pilot beacons. The LCIB receives channel-list message information associated with one or more macro-network coverage areas within a vicinity of the LCIB. The LCIB then uses the received channel-list message information to identify a set of macro-network carriers on which to transmit a frequency-hopping pilot beacon. The LCIB can then transmit its frequency-hopping pilot beacon on each of the carriers in the identified set.

20 Claims, 5 Drawing Sheets

U.S. PATENT DOCUMENTS

| | | | |
|---|---|---|---|
| 6,571,284 B1 | 5/2003 | Suonvieri | |
| 6,658,269 B1 | 12/2003 | Golemon et al. | |
| 6,690,915 B1 | 2/2004 | Ito et al. | |
| 6,697,603 B1 | 2/2004 | Lovinggood et al. | |
| 6,721,331 B1 | 4/2004 | Agrawal et al. | |
| 6,729,929 B1 | 5/2004 | Sayers et al. | |
| 6,735,432 B1 | 5/2004 | Jarett et al. | |
| 6,754,196 B1 | 6/2004 | Daane et al. | |
| 6,993,287 B2 | 1/2006 | O'Neill | |
| 7,006,797 B1 | 2/2006 | Sullivan et al. | |
| 7,035,587 B1 | 4/2006 | Yarkosky | |
| 7,046,964 B1 | 5/2006 | Sullivan et al. | |
| 7,065,361 B1 | 6/2006 | Fortuna | |
| 7,117,015 B2 | 10/2006 | Scheinert et al. | |
| 7,145,890 B1 | 12/2006 | Seo et al. | |
| 7,190,937 B1 | 3/2007 | Sullivan et al. | |
| 7,299,005 B1 | 11/2007 | Yarkosky et al. | |
| 7,457,295 B2 | 11/2008 | Saunders et al. | |
| 7,457,584 B2 | 11/2008 | Baker et al. | |
| 7,480,485 B1 | 1/2009 | Oh et al. | |
| 7,623,866 B1 | 11/2009 | Spitzer | |
| 7,738,647 B2 | 6/2010 | Davis et al. | |
| 7,848,302 B1 | 12/2010 | Talley et al. | |
| 7,848,758 B1 | 12/2010 | Sill et al. | |
| 8,335,503 B1* | 12/2012 | Desmond et al. | 455/422.1 |
| 2001/0031621 A1 | 10/2001 | Schmutz | |
| 2001/0036837 A1 | 11/2001 | Uistola | |
| 2001/0049281 A1 | 12/2001 | Duplessis et al. | |
| 2002/0044594 A1 | 4/2002 | Bongfeldt | |
| 2002/0045431 A1 | 4/2002 | Bongfeldt | |
| 2002/0052201 A1 | 5/2002 | Wilhelmsson et al. | |
| 2002/0183039 A1 | 12/2002 | Padgett et al. | |
| 2002/0186749 A1 | 12/2002 | Jones | |
| 2003/0083069 A1 | 5/2003 | Vadgama | |
| 2003/0114103 A1 | 6/2003 | Dinkel et al. | |
| 2003/0176192 A1 | 9/2003 | Morimoto et al. | |
| 2003/0211828 A1 | 11/2003 | Dalgleish et al. | |
| 2004/0106408 A1 | 6/2004 | Beasley et al. | |
| 2004/0152480 A1 | 8/2004 | Willars et al. | |
| 2004/0204097 A1 | 10/2004 | Scheinert et al. | |
| 2004/0235478 A1 | 11/2004 | Lindquist et al. | |
| 2005/0148368 A1 | 7/2005 | Scheinert et al. | |
| 2005/0227619 A1 | 10/2005 | Lee et al. | |
| 2008/0002628 A1 | 1/2008 | Bi et al. | |
| 2009/0098871 A1* | 4/2009 | Gogic | 455/435.1 |
| 2009/0129336 A1 | 5/2009 | Osborn | |
| 2009/0176453 A1 | 7/2009 | Wilhelmsson et al. | |
| 2009/0215452 A1* | 8/2009 | Balasubramanian et al. | 455/434 |
| 2009/0247170 A1* | 10/2009 | Balasubramanian et al. | 455/445 |
| 2010/0048212 A1* | 2/2010 | Yavuz et al. | 455/436 |
| 2010/0210280 A1* | 8/2010 | Haynes et al. | 455/456.1 |
| 2010/0216478 A1* | 8/2010 | Buddhikot et al. | 455/450 |
| 2010/0279686 A1 | 11/2010 | Tokgoz et al. | |
| 2010/0315967 A1 | 12/2010 | Patel et al. | |
| 2010/0329132 A1 | 12/2010 | Raghothaman et al. | |

OTHER PUBLICATIONS

Steve Adams, "The Demands on In-Building Solutions—Using smart antennas and adaptive techniques to improve in-building technique," Wireless Business & Technology Magazine, May 20, 2003.
U.S. Appl. No. 11/257,661, filed Oct. 25, 2005.
Office action from U.S. Appl. No. 11/257,661, dated May 2, 2008.
Office action from U.S. Appl. No. 11/257,661, dated Nov. 26, 2008.
U.S. Appl. No. 11/257,648, filed Oct. 25, 2005.
Office action from U.S. Appl. No. 11/257,648, dated Dec. 30, 2008.
Office action from U.S. Appl. No. 11/236,351, dated Oct. 10, 2007.
U.S. Appl. No. 11/449,527, filed Jun. 8, 2006.
Office action from U.S. Appl. No. 11/449,527, dated Oct. 2, 2009.
Office action from U.S. Appl. No. 11/449,527, dated Apr. 14, 2010.
Office action from U.S. Appl. No. 11/449,527, dated Jul. 2, 2010.
Office action from U.S. Appl. No. 11/449,527, dated Sep. 24, 2010.
Office action from U.S. Appl. No. 11/484,001, dated Mar. 6, 2009.
U.S. Appl. No. 12/627,758, filed Nov. 30, 2009.
Notice of Allowance from U.S. Appl. No. 12/627,758, dated Jun. 13, 2012.

* cited by examiner

USE OF MACRO-NETWORK CHANNEL-LIST MESSAGES FOR SELECTION OF CARRIERS FOR LOW-COST INTERNET BASE-STATION FREQUENCY-HOPPING PILOT BEACONS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. Service providers that operate these wireless networks typically distribute mobile stations to their subscribers, perhaps by selling the mobile stations at retail outlets or over the Internet, or perhaps by offering mobile stations at no cost to people that subscribe to a particular service plan. Service providers then typically assign to each mobile station a telephone directory number—often known as a mobile identification number (MIN) or mobile directory number (MDN)—under which a mobile station may operate. Via a manual or over-the-air provisioning process, the service provider will cause the mobile station to store its MIN in its Number Assignment Module (NAM). Furthermore, a mobile station typically is provided at the time of manufacture with an electronic serial number (ESN), which identifies the mobile station as a unique physical device.

These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. Each macro base station might have a capability of providing service on a first set of carriers during normal operation, and in addition, on a second set of "overflow" carriers held in reserve as necessary to handle increases in traffic.

Mobile stations are programmed to use a pre-determined algorithm to select one of the carriers set forth in a channel-list message (CLM) to use in future communications with a base station. In particular, each mobile station may apply a hash function, perhaps keyed to its MIN and/or ESN, to select one of the carriers. When a mobile is not engaged in an active communication session, the mobile station does what is known as idling on the selected carrier, which means that the mobile station is tuned to that carrier for receiving page messages, SMS messages, and other similar messages, and that the mobile station will also send access requests for call origination and other purposes to the base station on that carrier.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 Wi-Fi enabled) router. That router may include one or more Ethernet ports to which additional computers or other devices may also be connected, and may include wireless-access-point functionality, providing a WiFi packet-data interface to, for example, laptop computers, digital video recorders (DVRs), appliances, and/or any other computing devices or wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells, femto base stations, femto base transceiver stations (BTSs), picocells, pico base stations, pico BTSs, microcells, micro base stations, micro BTSs, and other names. Note that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is functionally a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing local wireless coverage on the wireless-service provider's network via the user's Internet connection. Usually, an LCIB will provide service on a single RF carrier (or on a single carrier per technology, where multiple technologies (such as CDMA and EV-DO) are supported), and also transmit what is known as a pilot beacon, which includes administrative messages and parameters that mobile stations can use to connect with the LCIB. LCIBs typically also include a Global Positioning System (GPS) receiver for receiving and decoding GPS signals for use in determination of location, as well as for use in synchronizing operations with other LCIBs and with the macro network based on timing information embedded in the GPS signal.

SUMMARY

LCIBs normally have auto-configuration capabilities, such that they do not require significant manual configuration by a user of the device. Location information can be utilized to retrieve from a central database of licensed carriers a list of licensed carriers in the region in which the LCIB is positioned. For example, an LCIB can retrieve a list of all licensed carriers in the current geographic region (for example, by county) from a licensee database maintained by the United States Federal Communications Commission (FCC). The LCIB can then use this list in choosing a set of carriers on which to broadcast its pilot beacon in order to advertise service capabilities to mobile stations in its vicinity. LCIBs generally use traffic channels different from those typically used on the macro network, and thus must broadcast a pilot beacon to advertise their presence to mobile stations that will not typically be looking for service on LCIB traffic-channel frequencies.

Some geographic areas may include macro-network base stations that provide service on different carriers, perhaps including one or more macro-network base stations that themselves provide service on multiple carriers. An LCIB operating in such a geographic area may provide what is known as a frequency-hopping pilot beacon in order to reach all or most potential mobile stations operating in the geographic area. A pilot beacon is a broadcast that includes administrative messages and parameters that mobile stations can use to connect with the LCIB. The frequency-hopping pilot beacon is a pilot beacon provided on two or more different frequencies in a time-shared manner, such that a pilot beacon is cyclically broadcast on a number of macro-network carriers.

Most LCIBs can only broadcast a frequency-hopping pilot beacon on a limited number of macro-network carrier frequencies. An LCIB may be capable, for example, of cyclically broadcasting a frequency-hopping pilot beacon on only five carriers.

Methods and systems are provided herein for prioritizing carriers in low-cost-Internet-base-station-(LCIB) frequency-hopping pilot beacons. In one aspect, an exemplary embodiment may take the form of a method for an LCIB to select carriers for a frequency-hopping pilot beacon. In accordance with the method, the LCIB provides a frequency-hopping pilot beacon that repeatedly cycles through transmitting pilot-beacon information on each of multiple carriers. The LCIB receives channel-list message information, which lists macro-network carriers that a mobile device can idle on in coverage areas in the vicinity of where the LCIB is positioned.

If the total number of carriers identified is equal to or less than the carrier limit of the LCIB device, then the LCIB may cyclically broadcast its frequency-hopping pilot beacon on those macro-network carriers. If the total number of carriers identified is greater than the carrier limit of the LCIB device, then the LCIB may prioritize the list based on the identified number of coverage areas (e.g., sectors, cells, BTSs) that broadcast channel-list message information including each carrier. The LCIB may then cyclically broadcast its frequency-hopping pilot beacon on those prioritized macro-network carriers.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
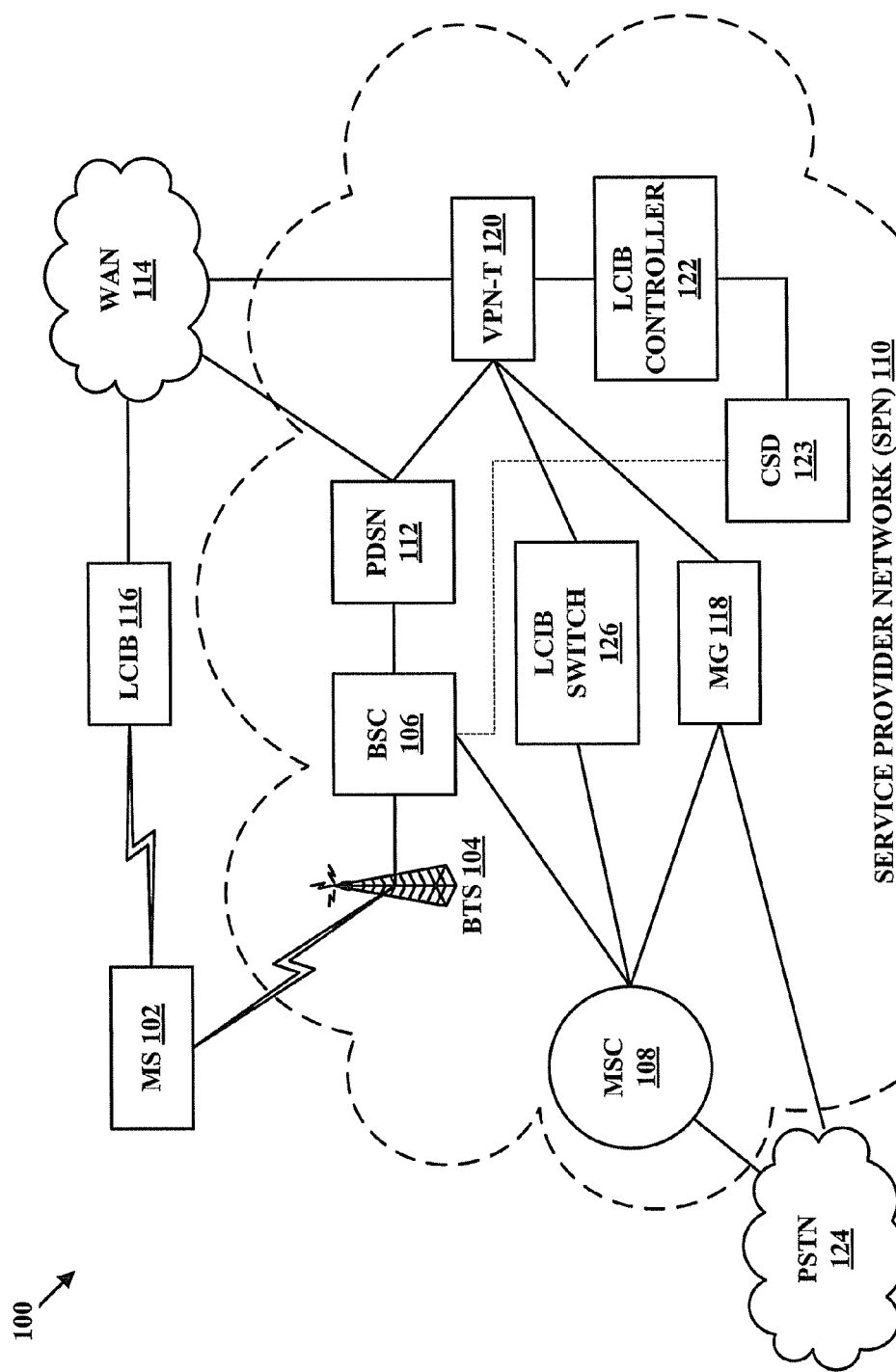
FIG. 1 is a simplified block diagram of a communication system, in accordance with exemplary embodiments.

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a house, and so on. Along with limited transmission power, LCIBs are also designed to have a relatively low capacity for serving mobile stations. For example, an LCIB may provide a single CDMA carrier and have the capacity (e.g. channel elements) to provide service to up to five mobile stations at any given time, though any suitable number of channel elements (and/or carriers) may be used in a given implementation.

As described, LCIBs typically emit a pilot beacon that includes administrative messages and parameters that mobile stations can use to facilitate handoffs from the macro network to the LCIB's carrier. In particular, the pilot beacon normally includes channels known as the pilot, paging, and sync channels. Thus, among the purposes of the LCIB's pilot beacon is to advertise the LCIB's carrier in the LCIB's coverage area, such that mobile stations can opt to tune to that carrier and communicate via the LCIB. As such, the LCIB transmits its pilot beacon on the one or more macro-network carriers in the surrounding area, and more particularly, on the forward-link component of each of those one or more macro-network carriers.

In particular, after an initial auto-configuration process, an LCIB will transmit either what is known as and referred to herein as a "fixed" pilot beacon, or what is known as and referred to herein as a "frequency-hopping" pilot beacon. If the one or more macro base stations in the surrounding area all operate on the same carrier, the LCIB will transmit its pilot beacon on only that carrier (i.e. a fixed pilot beacon). If multiple carriers are provided by the surrounding macro network, however, the LCIB will cycle through those carriers, transmitting its pilot beacon on each macro-network carrier for a fixed period of time (i.e. a frequency-hopping pilot beacon), such as a few hundred milliseconds or one or two seconds.

In the case of a frequency-hopping pilot beacon, the LCIB will typically transmit its pilot-beacon information on each carrier in a set of carriers for a fixed amount of time, and then repeat. Thus, the overall cycle takes a finite amount of time, and the LCIB typically needs to spend some minimum amount of time broadcasting on each carrier. Taken together, this limits the total number of carriers on which the LCIB can transmit its pilot-beacon information each cycle to an upper-bound number of carriers referred to herein at times as the LCIB Limit. However, the total number of macro-network carriers provided by the macro network surrounding the LCIB may exceed this upper bound. As such, the LCIB's pilot beacon may not be able to hop to some macro-network carriers, which may cause mobile stations operating on those carriers to not become aware of the LCIB.

In accordance with the present invention, the LCIB selects and perhaps prioritizes certain macro-network carriers over others for inclusion in the frequency-hopping pilot beacon, which is to say inclusion in the set of carriers on which the frequency-hopping pilot beacon hops. The LCIB identifies a list of carriers provided by the nearby macro network based on channel-list message information obtained from coverage areas in the vicinity of the LCIB. For example, an LCIB could receive channel-list information in the form of channel-list messages (CLM) maintained by base transceiver stations (BTSs) in a cellular wireless network. An LCIB could also receive channel-list information in other manners or forms.

An LCIB may obtain the list of macro-network carriers from which to select by wirelessly receiving a channel-list message (CLM) over the air from nearby macro sectors, or by accessing a remote cell-site database to acquire the lists, perhaps using an identifier of nearby macro sectors, an identifier of the LCIB, the location of the LCIB, and/or some other search key(s). The LCIB then aggregates the carriers listed on a particular set of CLMs of nearby macro sectors, and may sort the list based on the number of CLMs each carrier appears on. If the list includes more carriers than the LCIB supports (the LCIB Limit, for example five), the LCIB may discard all carriers other than an LCIB Limit number of carriers, keeping only those carriers that appear on the most CLMs. The LCIB may then cyclically broadcast its pilot beacon on the remaining LCIB Limit (in this case, five) carriers.

By utilizing CLMs as the universe of carriers from which the LCIB chooses those on which to broadcast its pilot beacon, the LCIB will not broadcast its pilot beacon on those carriers on which nearby mobile stations are most likely not idling. In this manner, the LCIB may be prevented from even considering licensed overflow carriers in the region that are currently not being used. Additionally, by cross-referencing CLMs maintained by one or more nearby coverage areas, the LCIB can more effectively prioritize the carriers on which it broadcasts its pilot beacon, likely increasing efficiency and reaching more idling mobile stations in the vicinity.

In general, prioritizing the carriers on which the LCIB will broadcast its pilot beacon does not exclude the possibility of still hopping onto other, lower-priority macro-network carriers. For example, an LCIB may still provide its pilot beacon on the lower-priority carriers, but will broadcast its beacon on higher-priority carriers more often than the lower-priority carriers. The LCIB may broadcast its pilot beacon on the higher-priority carriers more times per cycle, or perhaps in a greater number of cycles per hour, per day, etc. than the lower-priority carriers. Other possibilities exist without departing from the scope and spirit of the present invention.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a service provider network (SPN) 110, a Wide Area Network (WAN) 114, an LCIB 116, and a public switched telephone network (PSTN) 124. The SPN 110 includes a macro base transceiver station (BTS) 104, a base station controller (BSC) 106, a mobile switching center (MSC) 108, a packet data serving node (PDSN) 112, a media gateway (MG) 118, a VPN terminator (VPN-T) 120, an LCIB controller 122, a cell-site database (CSD) 123, and an LCIB switch 126. Additional entities could be present without departing from the spirit of the invention, such as additional mobile stations in communication with BTS 104, additional entities in communication with WAN 114 and/or PSTN 124, etc. Also, there could be one or more devices and/or networks making up at least part of one or more communication links. For example, there could be one or more routers, cable modems, and/or other devices or networks on the link between LCIB 116 and WAN 114.

Figure 2:
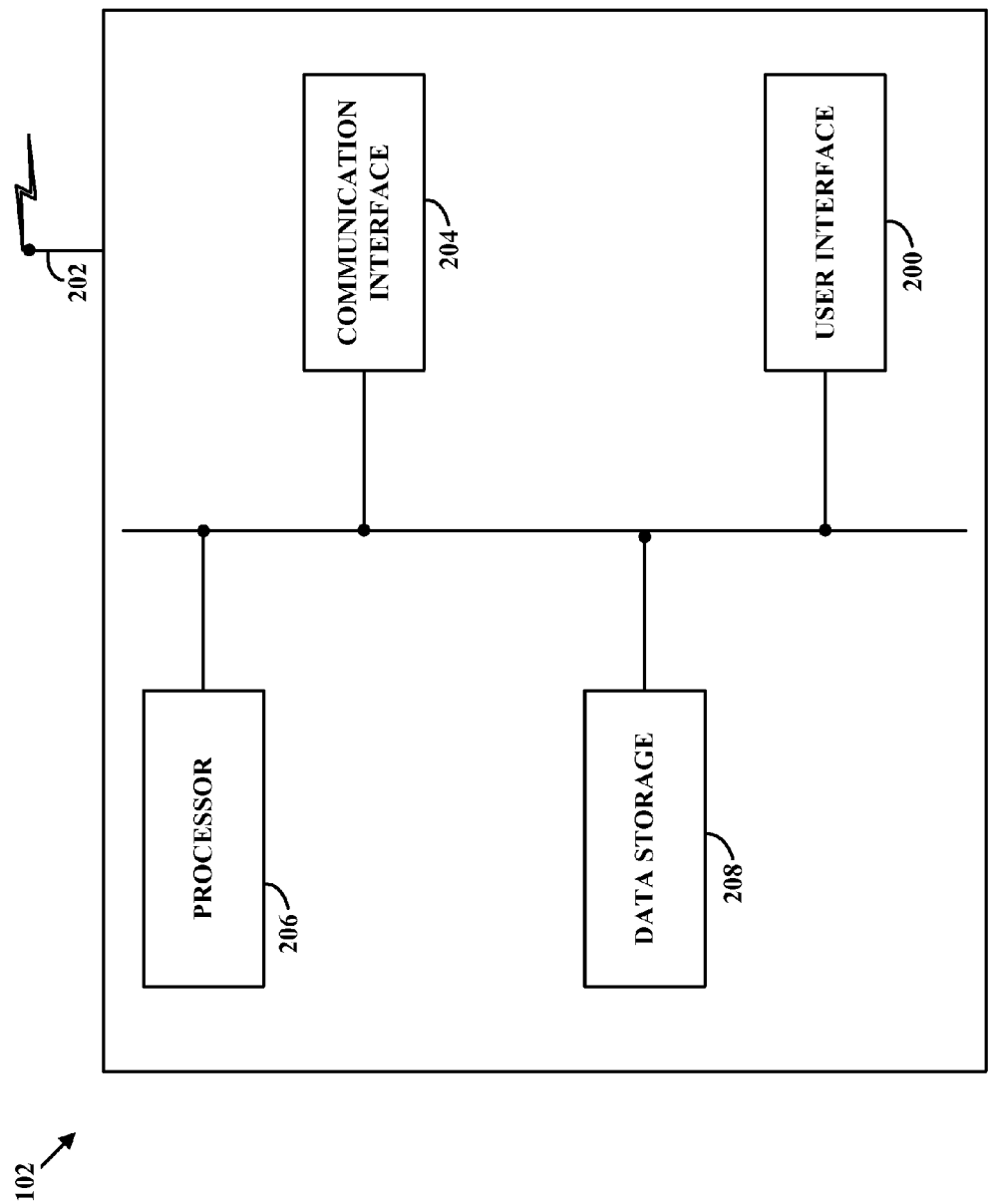
FIG. 2 is a simplified block diagram of a wireless mobile station, in accordance with exemplary embodiments.

Mobile station 102 may be any mobile device arranged to carry out the mobile-station functions described herein. FIG. 2 is a simplified block diagram of a mobile station (MS) 102, in accordance with an exemplary embodiment. As shown, mobile station 102 may include a user interface 200, a wireless-communication interface 202/204, a processor 206, and data storage 208 comprising instructions executable by the processor for carrying out those mobile-station functions. The user interface 200 may include buttons, a touch-screen, a microphone, and/or any other elements for receiving inputs, as well as a speaker, one or more displays, and/or any other elements for communicating outputs.

The wireless-communication interface 202/204 of the mobile station 102 may include an antenna 202 and a chipset 204 suitable for communicating with one or more macro base stations 104 and/or one or more LCIBs 116 over suitable air interfaces. For example, the chipset 204 could be suitable for CDMA communication. The chipset 204 or wireless-communication interface 202/204 in general may also, or instead, be able to communicate with other types of networks and devices, such as EV-DO networks, Wi-Fi networks, Bluetooth devices, and/or one or more additional types of networks and devices. The processor 206 and data storage 208 may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Returning to FIG. 1, macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA (and/or any other protocol(s)) coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, LCIB switch 126, and PDSN 112. In general, BSC 106 functions to control one or more macro BTSs such as macro BTS 104, and to provide those one or more macro BTSs with connections to devices such as MSC 108, LCIB switch 126, and/or PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, LCIB switch 126, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, LCIB switch 126, and PSTN 124. In general, MSC 108 acts as a switch between (a) PSTN 124 and one or more BSCs such as BSC 106 and/or (b) between PSTN 124 and one or more LCIBs 116 via LCIB switch 126, facilitating communication between mobile stations and PSTN 124.

Service-provider network 110 may encompass all or some of the network elements depicted in FIG. 1 as being included in its dashed-cloud shape. In general, there may be more and/or different communication links among entities within service-provider network 110 than those set forth in FIG. 1, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, WAN 114, and VPN terminator 120. In general, PDSN 112 acts as a network access server between WAN 114 and BSCs such as BSC 106, facilitating packet-data communication between mobile stations and WAN 114 via macro base stations.

WAN 114 may be the well-known global packet-data network generally referred to as the Internet. However, WAN 114 may also be or include one or more other packet-data networks, without departing from the scope and spirit of the present invention. As such, WAN 114 may include one or more other wide area networks, one or more local area networks, one or more public networks, one or more private networks, one or more wired networks, one or more wireless networks, and/or one or more networks of any other type. Devices in communication with WAN 114 may exchange data using a packet-switched protocol such as the Internet Protocol (IP), and may be uniquely identified by an address such as an IP address.

Figure 3:
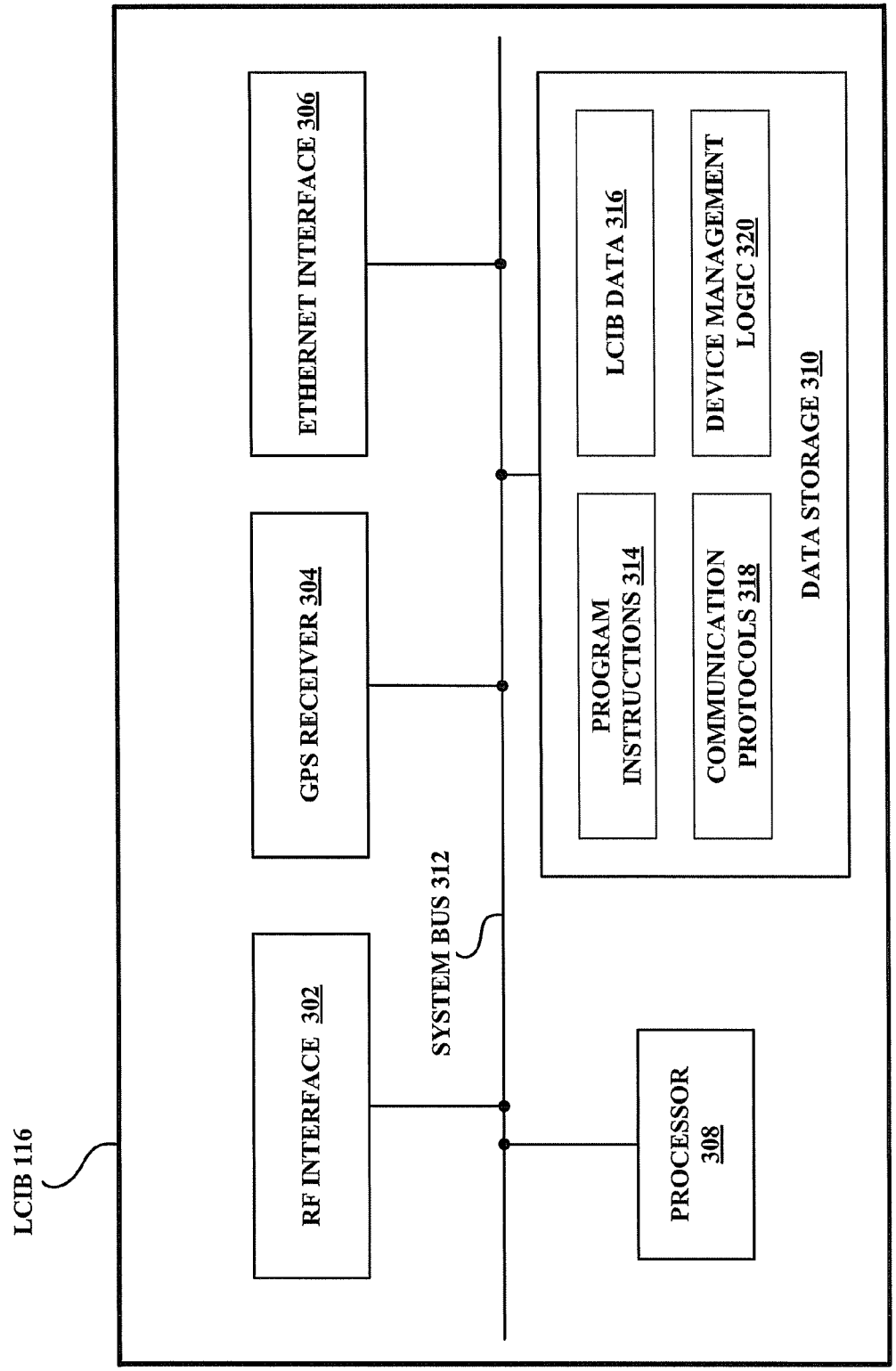
FIG. 3 is a simplified block diagram of a low-cost internet base station (LCIB), in accordance with exemplary embodiments.

LCIB 116 may be any computing and communication device arranged to carry out the LCIB functions described herein. As such, LCIB 116 may include a communication interface, a processor, and data storage comprising instructions executable by the processor for carrying out those LCIB functions. FIG. 3 depicts an exemplary diagram of LCIB 116, which includes an RF interface 302, a GPS receiver 304, an Ethernet interface 306, a processor 308, and data storage 310, all communicatively linked by a system bus 312. Note that LCIB 116 could have additional and/or different components than those set forth in FIG. 3, and that this structure is provided by way of example.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 304 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 306 may provide a wired packet-data interface for communicating with a device such as a router or cable modem. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the LCIB functions described herein, (b) LCIB data 316, which may be any operational data or other type of data stored for use by LCIB 116, (c) communication protocols 318, facilitating and enabling communication with one or more other devices, and (d) device management logic 320, perhaps for memory and file management. Returning to FIG. 1, media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122, PDSN 112, LCIB switch 126, MG 118, and WAN 114. In general, VPN terminator 120 functions to establish secure VPN connections over WAN 114 with LCIBs such as LCIB 116, enabling the LCIBs to securely communicate with devices on the SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level, channel-list messages, candidate carriers for pilot-beacon broadcasts), and to transmit those parameters to LCIBs, perhaps along with other configuration data and messaging.

Cell-site database (CSD) 123 may be a database of channel-list message information organized by cell sectors on which service is currently being provided by the BTSs 104 of the macro network. Specifically, the CSD may maintain a database of channel-list messages (CLMs) by geographic location (e.g. by sector) such that an LCIB 116 or LCIB controller 122 can provide a location or other identifier to the CSD, and receive in response one or more CLMs maintained by BTSs 104 (e.g., by sectors thereof) determined to be in the vicinity of the LCIB 116. While the CSD is illustrated as being provided and maintained within the SPN 110, it may also be provided outside of the SPN 110, and may, for example, be accessible to the LCIB controller 122 via an Internet connection. Alternately, the CSD 123 may be provided locally within the LCIB controller 122 or locally within each LCIB 116. Other arrangements are possible as well.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

3. Exemplary Operation

Figure 4:
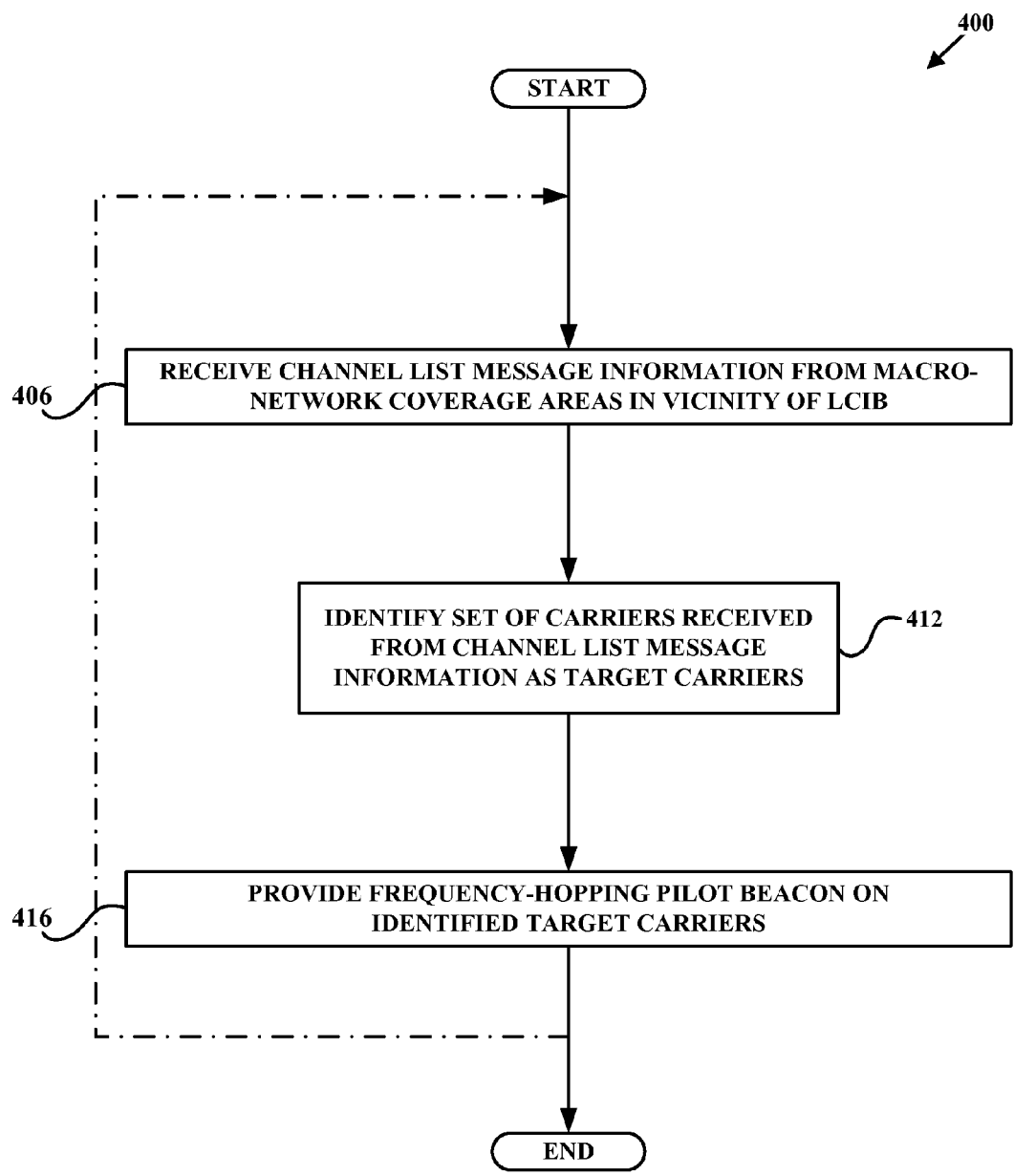
FIG. 4 is a flowchart of a first method, in accordance with an exemplary embodiment.
Figure 5:
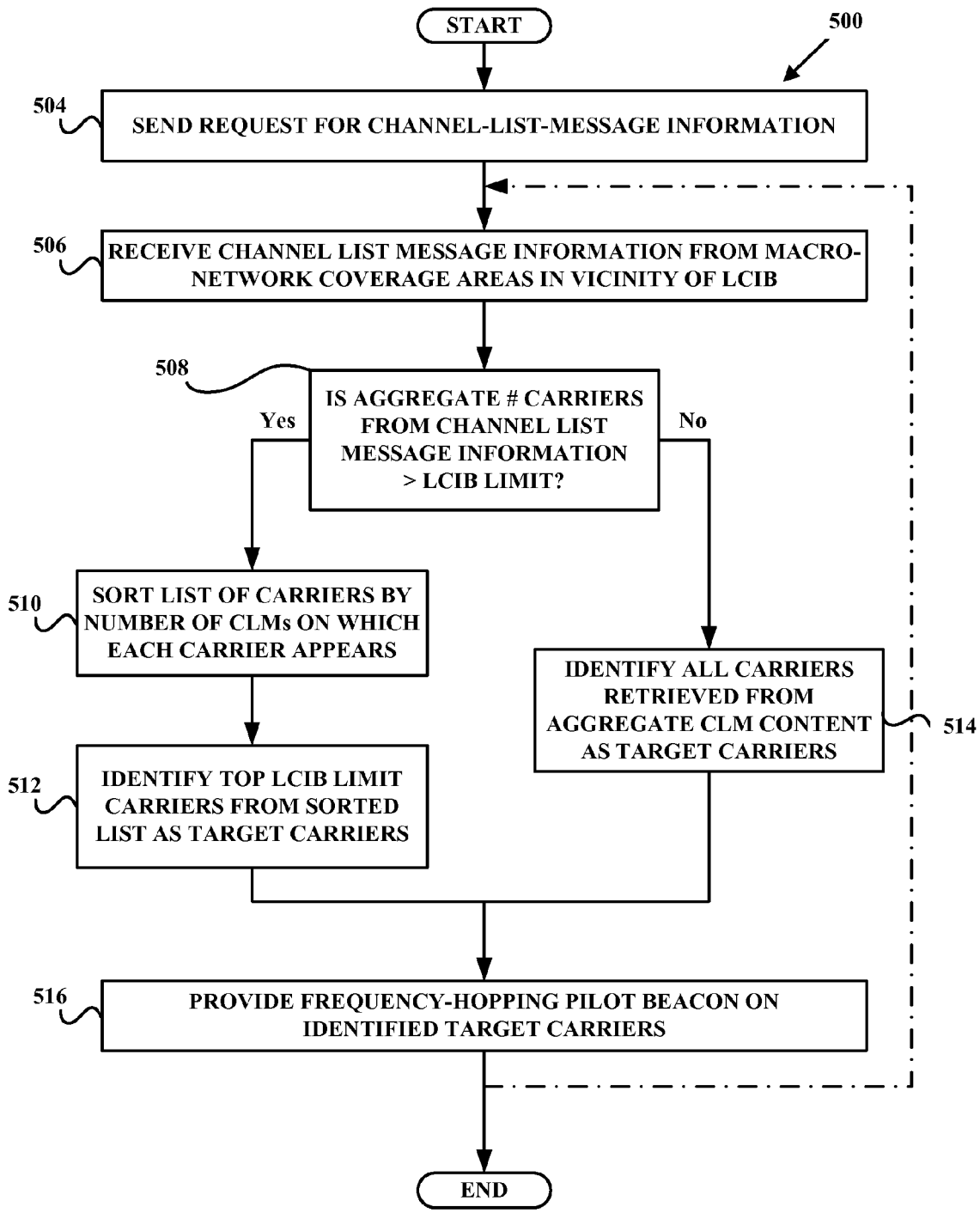
FIG. 5 is a flowchart of a second method, in accordance with another exemplary embodiment.

While FIGS. 4 and 5 separately set forth first and second exemplary methods, it should be noted that these methods are not exclusive of one another. Steps set forth in FIG. 4 could be alternately incorporated in FIG. 5, and vice versa. Specifically, it is contemplated that one or more steps set forth in either of FIG. 4 or 5 could be bodily incorporated in the alternate figure without departing from the spirit and scope of the invention.

a. A First Exemplary Method

FIG. 4 depicts a flowchart of a first exemplary method, in accordance with an exemplary embodiment. In particular, FIG. 4 depicts a method 400 for an LCIB to receive and use channel-list message information setting forth a set of carriers on which to transmit its frequency-hopping pilot beacon (FHPB).

As shown in FIG. 4, method 400 begins at step 406, when LCIB 116 receives channel-list message information, perhaps from the LCIB controller 122. The channel-list message information may set forth carriers currently being used by coverage areas determined to be in the vicinity of the LCIB 116. At step 412, the LCIB 116 may identify carriers as carriers on which to broadcast its FHPB. At step 416, the LCIB 116 may cyclically broadcast its FHPB on the carriers identified in step 412.

i. Receive Channel-List Message Information for Nearby Macro Sectors/Base Stations At step 406, LCIB controller 122 receives channel-list message information, including perhaps channel-list messages (CLMs) themselves or perhaps a compiled report, of nearby coverage areas (sectors, BTSs, etc.), perhaps from cell-site database (CSD) 123. The channel-list message information preferably indicates the carriers on which service is currently being provided in a vicinity of the LCIB 116.

As noted earlier, mobile stations are programmed to select and idle on one of those carriers set forth in a CLM based on a pre-determined algorithm executed by the mobile station. In an idle state, the mobile station is tuned to that carrier to check for incoming pages, SMS messages, and the like, and the mobile station sends any access requests to the base station on that carrier.

Advantageously, channel-list messages (CLMs) do not include carrier information for overflow carriers on which no mobile stations will be idling. For example, although a BTS 104 may include hardware and software to allow the BTS 104 to communicate with mobile stations 102 on one or more overflow carriers, the BTS 104 will typically not utilize those overflow carriers unless traffic levels demand it. Therefore, channel-list messages may include a subset of the actual carriers on which a particular BTS 104 is capable of transmitting and/or is licensed to transmit. By utilizing channel-list message information instead of a database of all licensed carriers, including overflow carriers, an LCIB 116 can avoid wasting its limited resources broadcasting a pilot beacon on carriers on which little or no mobile stations will currently be idling. The channel-list message information may be maintained at any one or more entities in the service provider network 110, but is preferably maintained by a cell-site database 123.

The cell-site database 123 may include channel-list message information cross-referenced by location for BTSs, cells, and/or sectors in the macro network (coverage areas). Each such coverage area could be operating according to a protocol such as CDMA, EV-DO, WiMax, or some combination thereof. Other protocols and combinations thereof may be used as well.

While the term "channel-list message" is utilized for ease of reference, the CSD 123 need not be organized or comprised of actual CLMs. Rather, the content of the CSD 123 may merely reflect the content of CLMs broadcast in respective coverage areas (for example, sectors or BTSs). The content could be indexed relative to the location of the BTSs 104 that are broadcasting the respective CLMs. Additionally, while FIG. 1 shows that the CSD 123 is connected to the LCIB controller 122 and situated within the SPN 110, such an arrangement is not necessarily required. Alternately, the CSD 123 could be incorporated within the LCIB controller 122, or may be placed outside the SPN 110 and available to the LCIB controller 122 via a local or wide-area network connection. The CSD 123 could also be placed within the LCIB 116 itself such that the LCIB 116 can directly access the CSD 123. Other examples are possible as well.

The database maintained by the CSD 123 can be static, automatically updatable, and/or manually updatable. As shown in FIG. 1, the CSD 123 may be directly or indirectly connected to one or more BSCs 106. A BSC 106 may automatically provide the CSD 123 with an updated copy of the current channel-list message being used on one or more sectors it is providing service to at intermittent or regular intervals. Alternately, other elements in the provider network could cause the CSD 123 to be updated. For example, a user interface (not shown) may be provided at the CSD 123 for manual updating of the CSD 123. Other examples are possible as well.

Upon request, the CSD 123 may use the location or other identification information provided to it to identify nearby coverage areas (e.g., sectors, BTSs, etc.) within the vicinity of the requesting LCIB 116, and thereby retrieve corresponding channel-list message information identifying carriers listed therein. Whether or not a BTS or sector is considered within the vicinity of a location provided to the CSD 123 could be determined by geographic proximity or by numerical proximity, as examples. Channel-list message information for all sectors or BTSs within a radial proximity could be returned to the LCIB 116, including for example, a 3-mile radius (i.e., a geographic proximity). Alternatively, channel-list message information for a fixed number of "closest" sectors or BTSs could be returned to the LCIB 116, including for example, the 10 closest BTSs (i.e., a numerical proximity). Additionally, the radial or numerical proximity could be based on some measurement unit other than sectors or BTSs. Finally, the radial or numerical proximity could be limited to only those sectors oriented towards the LCIB's 116 location, for example, the closest 10 sectors directed towards the LCIB's 116 location. Other possibilities exist as well. The maximum number of returned sectors or BTSs may be modifiable, and may change by region or time of day or by year, as examples.

Once a particular set of nearby sectors or BTSs 104 is determined based on the location information received from the LCIB 116, channel-list message information for the identified sectors or BTSs may be aggregated into a list and transmitted to the LCIB 116. This list may include additional information beyond simply a list of carriers. For example, the list may include one or more sector or BTS 104 identifiers for each carrier so that the LCIB 116 may determine with which corresponding sector or BTS 104 a particular carrier included in the list is associated. The list may also include carriers on which a sector or BTS 104 has recently transmitted but is not currently transmitting, or carriers on which a sector or BTS 104 intends to transmit but is not currently transmitting. Additional and/or different information may be included in the list without departing from the scope or spirit of the invention.

ii. Provide Frequency-Hopping Pilot Beacon

At step 416, LCIB 116 provides a frequency-hopping pilot beacon that repeatedly cycles through transmitting pilot-beacon information on each of the multiple carriers identified in step 412. As explained above, this pilot beacon may include a pilot channel, a paging channel, and a sync channel. In general, the pilot-beacon information includes messages and parameters that mobile stations can use to facilitate handoffs from macro-network carriers to an LCIB's 116 carrier. As such, LCIB 116 causes its pilot beacon to cyclically hop to multiple macro-network carriers on which service is provided by the macro network in the surrounding area.

As shown in FIG. 4, the LCIB 116 may continue broadcasting on the carriers identified in step 412 for an indeterminate amount of time. Alternatively, the LCIB 116 could intermittently retrieve updated channel-list message information in order to monitor changes in the network, as indicated by the dashed line in FIG. 4.

b. A Second Exemplary Method

FIG. 5 depicts a flowchart of a second exemplary method, in accordance with an exemplary embodiment. In particular, FIG. 5 depicts a method 500 for an LCIB to receive and process a set of carriers on which to transmit its frequency-hopping pilot beacon (FHPB).

As shown in FIG. 5, method 500 begins at step 504, when LCIB 116 sends a request for channel-list message information. At step 504, the LCIB 116 provides its location, or perhaps a unique identifier that can be used to determine its position, to a network entity such as the LCIB controller 122, which may then retrieve channel-list message information and deliver the channel-list message information, or perhaps an aggregate list comprising channel-list message information, to the LCIB 116.

At step 506, LCIB 116 receives the channel-list message information, perhaps from the LCIB controller 122. The channel-list message information may set forth carriers currently being used by coverage areas determined to be in the vicinity of the LCIB 116.

At step 508, the LCIB 116 may determine whether the aggregate number of carriers returned by the LCIB controller 122 is greater than the number of carriers on which it is capable of transmitting its FHPB.

If the number of carriers returned by the LCIB controller 112 is greater than the capability of the LCIB 116, the LCIB 116 may sort the aggregate list of carriers based on the number of channel-list messages (CLMs) of nearby BTSs on which each carrier appears in step 510 and identify the LCIB Limit number of carriers appearing on the most CLMs at step 512. If the aggregate number of carriers returned by the LCIB controller 112 is equal to or less than the LCIB Limit, the LCIB 116 may identify those carriers as carriers on which to broadcast its FHPB at step 514.

At step 516, the LCIB 116 may cyclically broadcast its FHPB on the carriers identified in either step 512 or step 514.

i. Provide Location Information to LCIB Controller

At step 504, LCIB 116 sends a request for channel-list message information, perhaps by providing location information to the LCIB controller 122. The location information could be GPS coordinates provided by an internally available GPS receiver 204. Alternately, the location information could be a unique identifier such as a serial number that can be cross-referenced by the LCIB controller 122, or other network entity, to determine location information available in a cross-referenced table. Other possibilities exist as well.

ii. Receive Channel-List Message Information for Nearby Macro Sectors/Base Stations Step 506 of the second exemplary embodiment substantially mirrors step 406 of the first exemplary embodiment. Accordingly, a full description of step 506 will only include substantial departures from the steps and structure set forth above in regard to step 406, though any permutation of possibility described with respect to one may apply equally to the other, as is the case with FIGS. 4 and 5 generally.

At step 506, LCIB controller 122 receives channel-list message information, including perhaps channel-list messages (CLMs) themselves or perhaps a compiled report, of nearby coverage areas (sectors, BTSs, etc.), perhaps from cell-site database (CSD) 123. The channel-list message information preferably indicates the carriers on which service is currently being provided in a vicinity of the LCIB 116.

The cell-site database 123 may include channel-list message information cross-referenced by location for BTSs, cells, and/or sectors in the macro network (coverage areas). Upon request, the CSD 123 may use the location or other identification information provided to it to identify nearby coverage areas (e.g., sectors, BTSs, etc.) within the vicinity of the requesting LCIB 116, and thereby retrieve corresponding channel-list message information identifying carriers listed therein. Whether or not a BTS or sector is considered to be within the vicinity of a location provided to the CSD 123 could be determined by geographic proximity or by numerical proximity, as examples.

Once a particular set of nearby sectors or BTSs 104 is determined based on the location information received from the LCIB 116, channel-list message information for the identified sectors or BTSs may be aggregated into a list and transmitted to the LCIB 116. This list may include additional information beyond simply a list of carriers. For example, the list may include one or more sector or BTS 104 identifiers for each carrier so that the LCIB 116 may determine with which corresponding sector or BTS 104 a particular carrier included in the list is associated. Additional and/or different information may be included in the list without departing from the scope or spirit of the invention.

iii. Determine Number of Carriers and LCIB Capabilities

At step 508, the LCIB 116 compares the list received in step 506 it to its current pilot beacon carrier broadcast capability (LCIB Limit). As set forth above, LCIBs 116 are designed with low costs in mind, and therefore have limited processing, transmit, and receive capabilities in comparison to a traditional BTS/BSC pairing in a macro network. For example, most LCIBs can only broadcast a frequency-hopping pilot beacon (FHPB) on a limited number of carriers. An LCIB 116 may be capable, for example, of cyclically broadcasting a FHPB on only five carriers. The maximum number of carriers that a particular LCIB 116 is capable of hopping may be a hardware limitation and/or a software limitation, and may be indicated by a set value stored in the device or may be a value discovered through an internal scanning process or computation process, among other possibilities.

The LCIB 116 may compare the number of carriers set forth in the list of carriers received from the LCIB controller 122 in step 506 to the number of carriers on which the LCIB 116 is capable of broadcasting its pilot beacon (LCIB Limit). If the capabilities of the LCIB 116 do not support broadcasting of the pilot beacon on all of the channels set forth in the received list of carriers, it will proceed to steps 510 and 512. If the LCIB 116 is capable of broadcasting its pilot beacon on all of the carriers set forth in the received list of carriers, it will proceed to step 514.

Iv. If Capable, Broadcast Pilot Beacon on all Carriers in List

Step 514 is executed only if the LCIB 116 is capable of broadcasting its pilot beacon on all of the carriers set forth in the list of carriers received in step 506. In this step, the LCIB 116 will identify all carriers in the list as target carriers on which to transmit its pilot beacon. Table 1 illustrates an example where step 514 could be carried out.

TABLE 1

Example Channel-List Message Information for Nearby Sectors/BTSs

| BTS ID # | Distance | Carriers included in Macro-Network Channel-List Message |
|---|---|---|
| 1 | 0.25 Miles | A, B, C |
| 2 | 0.5 Miles | B, C, D |
| 3 | 1 Mile | D, E |

Although this example includes a BTS ID number in column 1, other coverage area unit identifiers could also be used, for example, a sector ID number. In this example, the LCIB 116 may be located near BTSs having IDs 1, 2, and 3. Although the channel-list message information of Table 1 shows BTSs within 1 mile of LCIB 116, in this example, LCIB controller 122 uses a radial distance of 0.75 miles in determining which BTSs are within the vicinity of LCIB 116. In this case, only the channel-list message information for BTS IDs 1 and 2 would be retrieved, aggregated, and returned to the LCIB 116. Once the LCIB receives a list containing the carriers A, B, C, and D, it will compare the number of carriers (here, four) to the maximum capability it has in broadcasting a pilot beacon. Assuming the maximum number is five, as set forth earlier, then the LCIB 116 can simply transmit its frequency-hopping pilot beacon (FHPB) across the four carriers A, B, C, and D. Specifically, the LCIB will cycle through carriers A, B, C, and D, transmitting its pilot beacon on each macro-network carrier for a fixed period of time (i.e. a frequency-hopping pilot beacon), such as a few hundred milliseconds or one or two seconds.

As noted earlier, the LCIB 116 utilizes carriers for data traffic different from those used by the macro network, and thus must advertise its presence to mobile stations that are not programmed to look for service at LCIB 116 carrier frequencies by broadcasting the frequency hopping pilot beacon. Because the LCIB 116 retrieves channel-list message information from nearby coverage areas (base stations or sectors, for example), it broadcasts its pilot beacon on only those carriers that are currently being used in the area for mobile stations to idle on. Specifically, the LCIB 116 avoids broadcasting its pilot beacon on those carriers that may be licensed in the area but are not currently being used, such as overflow carriers. For example, even if BTS ID #1 was licensed to transmit on a carrier F as an overflow carrier, carrier F would not normally be included in BTS #1's channel-list message information, and thus, the LCIB would be prevented from needlessly broadcasting its pilot beacon on carrier F.

v. Alternately, Broadcast Pilot Beacon On Sorted List of Carriers

Steps 510 and 512 are executed only if the capabilities of the LCIB 116 do not support broadcasting of the pilot beacon on all of the channels set forth in the list of carriers received in step 506, due to a hardware and/or software limitation of the LCIB 116.

In step 510, the LCIB 116 will sort the received list of carriers by a number of BTS channel-list messages on which each carrier appears. Thus, the received list would provide this information or would contain sufficient data from which it could be derived. As set forth earlier, the list need not be based on BTSs as coverage areas, but could be based on sectors or any other similar coverage area unit. Alternately, the sorting and selection could take place at the LCIB controller 122 instead of the LCIB 116, among many other possibilities.

Table 2 illustrates an example where these steps could be carrier out.

TABLE 2

Example Channel-List Message Information for Nearby BTSs

| BTS ID # | Distance | Carriers included in Macro-Network Channel-List Message |
|---|---|---|
| 1 | 0.25 Miles | A, B, C, D |
| 2 | 0.5 Miles | C, D, E |
| 3 | 1 Mile | D, E, F, G |

In this example, once the LCIB 116 receives channel-list message information for three nearby BTSs, assuming that all BTSs within 1.5 miles are classified as 'nearby,' the LCIB 116 will determine the number of carriers in the nearby coverage area and will know or determine its capabilities in broadcasting a pilot beacon. In this case, there are a total of seven carriers currently being utilized in BTSs within the vicinity of LCIB 116, including carriers A, B, C, D, E, F, and G. Assuming the LCIB 116 is only capable of broadcasting the frequency hopping pilot beacon (FHPB) on 5 carriers, it will proceed to sort the carriers by frequency of appearance on the BTSs' collective channel-list messages in order to determine the most frequently used carriers, and thus the best carriers on which to broadcast. In this case, the LCIB 116 may arrive at or receive a sorted list similar to the one set forth in Table 3.

TABLE 3

Sorted Carrier List for Nearby BTSs

| Carrier | Number of Channel-List Messages | BTS ID's Broadcasting on Carrier |
|---|---|---|
| D | 3 | 1, 2, 3 |
| C | 2 | 1, 2 |
| E | 2 | 2, 3 |
| A | 1 | 1 |
| B | 1 | 1 |
| F | 1 | 3 |
| G | 1 | 3 |

Once the list is sorted, the LCIB 116 will, at step 512, identify as target carriers for its pilot beacon the top 'n' number of carriers from the sorted list based on its capabilities, where 'n' represents the maximum number of carriers (LCIB Limit) on which the LCIB 116 is capable of broadcasting its frequency-hopping pilot beacon. In this case, the LCIB may cycle through carriers D, C, E, A, and B, transmitting its pilot beacon on each of those macro-network carriers for a fixed period of time (i.e. a frequency-hopping pilot beacon), such as for a few hundred milliseconds or one or two seconds, before cycling back to the beginning of the list. Because each of carriers A, B, F, and G appear on only one channel-list message, the process of identifying the carriers on which to broadcast may involve selecting any of these, and may involve selecting particular carriers in a pseudo-random pattern or in a fixed manner, as examples. Alternately, the LCIB 116 may only broadcast its pilot beacon on channels D, C, and E every time, and may then cycle through the remaining carriers A, B, F, and G in an alternating fashion on subsequent cycles. Other possibilities exist as well.

Because the LCIB 116 retrieves channel-list message information for nearby base stations, it identifies only those channels that are currently being used in the area for mobile stations to idle on. Specifically, the LCIB 116 avoids broadcasting its pilot beacon on those carriers that may be licensed in the area but are not currently being used, such as overflow carriers. Additionally, if the LCIB 116 retrieves a list of carriers that is greater than the number of carriers on which it is capable of broadcasting its pilot beacon, it can intelligently chose to broadcast its beacon on those carriers that are being utilized the most in the coverage area in which the LCIB 116 is located. As a result, the performance of the LCIB 116 may be improved and the number of mobile stations that the LCIB 116 can reach may be increased.

vi. Provide Frequency-Hopping Pilot Beacon

At step 516, LCIB 116 provides a frequency-hopping pilot beacon that repeatedly cycles through transmitting pilot-beacon information on each of the multiple carriers identified in steps 512 or 514. As explained above, this pilot beacon may include a pilot channel, a paging channel, and a sync channel. In general, the pilot-beacon information includes messages and parameters that mobile stations can use to facilitate handoffs from macro-network carriers to an LCIB 116's carrier. As such, LCIB 116 causes its pilot beacon to cyclically hop to multiple macro-network carriers on which service is provided by the macro network in the surrounding area.

As shown in FIG. 4, the LCIB 116 may continue broadcasting on the carriers identified in steps 512 or 514 for an indeterminate amount of time. Alternatively, the LCIB 116 could intermittently retrieve updated channel-list message information in order to monitor changes in the network, as indicated by the dashed line in FIG. 4.

4. Conclusion

Various exemplary embodiments have been described above. Those skilled in the art will understand, however, that changes and modifications may be made to those examples without departing from the scope of the claims.

The invention claimed is:

1. A method for a low-cost Internet base station (LCIB) to select carriers for a frequency-hopping pilot beacon, the method comprising:
   an LCIB receiving channel-list message information associated with one or more macro-network coverage areas within a vicinity of the LCIB;
   the LCIB using the received channel-list message information to identify a set of macro-network carriers on which to transmit a frequency-hopping pilot beacon; and
   the LCIB transmitting the frequency-hopping pilot beacon, wherein transmitting the frequency-hopping pilot beacon comprises repeatedly cycling through transmitting pilot-beacon information on each of the carriers in the identified set and, for each carrier in the identified set, prioritizing how often the pilot beacon information is transmitted on the carrier based on how many of the one or more macro-network coverage areas each includes the carrier in a channel-list message of the macro-network coverage area.

2. The method of claim 1, wherein the frequency-hopping pilot beacon comprises a pilot channel, a paging channel, and a sync channel.

3. The method of claim 1, further comprising:
sorting the carriers indicated in the received channel-list message information in order according to, for each carrier, how many of the one or more macro-network coverage areas each includes the carrier in a channel-list message of the macro-network coverage area.

4. The method of claim 3, wherein prioritizing how often the pilot beacon information is transmitted on each carrier based on how many of the one or more macro-network coverage areas each includes the carrier in a channel-list message of the macro-network coverage area comprises transmitting the pilot beacon information more often on a carrier that is included in a greater number of macro-network coverage area channel-list messages.

5. The method of claim 3, further comprising:
determining an LCIB limit, wherein the LCIB limit corresponds to a maximum number of carriers on which the LCIB is capable of transmitting its pilot beacon; and
wherein the LCIB using the received channel-list message information to identify a set of macro-network carriers on which to transmit a frequency-hopping pilot beacon comprises identifying from the sorted carriers an LCIB limit number of carriers that are included in a greatest number of macro-network coverage area channel-list messages.

6. The method of claim 5, wherein the LCIB limit is less than or equal to 5.

7. The method of claim 1, wherein at least one of the one or more macro-network coverage areas is selected from the group consisting of a code division multiple access (CDMA) coverage area, an Evolution Data Optimized (EV-DO) coverage area, and a WiMax coverage area.

8. The method of claim 1, wherein receiving the channel-list message information comprises requesting the channel-list message information from a cell-site database maintained by a wireless service provider.

9. The method of claim 8, wherein the LCIB receives the channel-list message information via a network connection that connects the LCIB to the wireless service provider via the Internet.

10. The method of claim 8, wherein receiving the channel-list message information comprises providing a location of the LCIB or a unique identifier of the LCIB to the cell-site database.

11. The method of claim 1, wherein the LCIB provides data and/or voice traffic to a mobile station over a carrier that is different from macro-network carriers.

12. A low-cost Internet base station (LCIB) comprising:
a communication interface;
a processor; and
data storage comprising instructions executable by the processor to: receive channel-list message information associated with one or more macro-network coverage areas within a vicinity of the LCIB;
use the received channel-list message information to identify a set of macro-network carriers on which to transmit a frequency-hopping pilot beacon; and
transmit the frequency-hopping pilot beacon, wherein transmitting the frequency-hopping pilot beacon comprises repeatedly cycling through transmitting pilot-beacon information on each of the carriers in the identified set and, for each carrier in the identified set, prioritizing how often the pilot beacon information is transmitted on the carrier based on how many of the one or more macro-network coverage areas each includes the carrier in a channel-list message of the macro-network coverage area.

13. The LCIB of claim 12, wherein the frequency-hopping pilot beacon comprises a pilot channel, a paging channel, and a sync channel.

14. The LCIB of claim 12, wherein the data storage further comprises instructions executable by the processor to:
sort the carriers indicated in the received channel-list message information in order according to, for each carrier, how many of the one or more macro-network coverage areas each includes the carrier in a channel-list message of the macro-network coverage area.

15. The LCIB of claim 14, wherein prioritizing how often the pilot beacon information is transmitted on each carrier based on how many of the one or more macro-network coverage areas each includes the carrier in a channel-list message of the macro-network coverage area comprises transmitting the pilot beacon information more often on a carrier that is included in a greater number of macro-network coverage area channel-list messages.

16. The LCIB of claim 14, wherein the data storage further comprises instructions executable by the processor to:
determine an LCIB limit, wherein the LCIB limit corresponds to a maximum number of carriers on which the LCIB is capable of transmitting its pilot beacon; and
wherein the LCIB using the received channel-list message information to identify a set of macro-network carriers on which to transmit a frequency-hopping pilot beacon comprises identifying from the sorted carriers an LCIB limit number of carriers that are included in a greatest number of macro-network coverage area channel-list messages.

17. The LCIB of claim 16, further comprising a GPS receiver, wherein the data storage further comprises instructions executable by the processor to provide a location of the LCIB determined by the GPS receiver to a cell-site database via the network connection.

18. The LCIB of claim 12, further comprising an Ethernet-based network connection, and wherein the LCIB receives the channel-list message information via the network connection.

19. A method for a low-cost Internet base station (LCIB) to select carriers for a frequency-hopping pilot beacon, the method comprising:
an LCIB sending a request for channel-list message information;
an LCIB receiving channel-list message information associated with macro-network coverage areas within a vicinity of the LCIB;
the LCIB using the received channel-list message information to identify a set of macro-network carriers on which to transmit a frequency-hopping pilot beacon;
the LCIB determining that the number of carriers set forth in the received channel-list message information is above an LCIB limit, wherein the LCIB limit corresponds to a maximum number of carriers on which the LCIB is capable of transmitting its pilot beacon; and the LCIB transmitting a frequency-hopping pilot beacon on an LCIB limit number of carriers selected from the carriers set forth in the received channel-list message information, wherein the selected carriers are those appearing on a highest number of channel-list messages of the macro-network coverage areas within the vicinity of the LCIB.

20. The method of claim 19, wherein, prior to transmitting the frequency-hopping pilot beacon, the LCIB sorts the carriers set forth in the channel-list message information according to a number of macro-network coverage areas within the predetermined vicinity of the LCIB that include each such carrier in the coverage area's respective channel-list message.

* * * * *